(12) United States Patent
Lanham et al.

(10) Patent No.: US 8,667,852 B2
(45) Date of Patent: *Mar. 11, 2014

(54) FLOW METER INCLUDING A BALANCED REFERENCE MEMBER

(75) Inventors: Gregory Treat Lanham, Longmont, CO (US); Christopher A. Werbach, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 165 days.

This patent is subject to a terminal disclaimer.

(21) Appl. No.: 13/264,795

(22) PCT Filed: May 11, 2009

(86) PCT No.: PCT/US2009/043418
§ 371 (c)(1),
(2), (4) Date: Oct. 17, 2011

(87) PCT Pub. No.: WO2010/132048
PCT Pub. Date: Nov. 18, 2010

(65) Prior Publication Data
US 2012/0042733 A1    Feb. 23, 2012

(51) Int. Cl.
*G01F 1/20*    (2006.01)
(52) U.S. Cl.
USPC ...................................................... 73/861.18
(58) Field of Classification Search
USPC ..................................... 73/861.355–861.357
See application file for complete search history.

(56) References Cited

U.S. PATENT DOCUMENTS

| | | | |
|---|---|---|---|
| 5,275,061 A | 1/1994 | Young et al. | |
| 6,505,131 B1 | 1/2003 | Henrot | |
| 2001/0035055 A1 | 11/2001 | Drahm et al. | |
| 2012/0073385 A1* | 3/2012 | Lanham et al. | 73/861.355 |

FOREIGN PATENT DOCUMENTS

| | | |
|---|---|---|
| EP | 0083144 A1 | 7/1983 |
| GB | 2001759 A | 2/1979 |
| JP | 02042319 | 2/1990 |
| WO | 2007130024 A1 | 11/2007 |

\* cited by examiner

*Primary Examiner* — Jewel V Thompson
(74) *Attorney, Agent, or Firm* — The Ollila Law Group LLC

(57) ABSTRACT

The present invention relates to a vibrating flow meter (210) and a method of providing a vibrating flow meter (210). The vibrating flow meter (210) includes a conduit (103A) and a driver (104) configured to vibrate the conduit (103A). The vibrating flow meter (210) also includes a first pick-off (105). The first pick-off (105) includes a first pick-off component (105a) and a second pick-off component (105b). The vibrating flow meter (210) also includes a reference member (150). The first pick-off component (105a) is coupled to the reference member (150) while the second pick-off component (105b) is coupled to the conduit (103A) proximate the first pick-off component (105a). The vibrating flow meter (210) also includes a balancing element (253) coupled to the reference member (150).

22 Claims, 4 Drawing Sheets

FLOW METER INCLUDING A BALANCED REFERENCE MEMBER

FIELD OF THE INVENTION

The present invention relates to a vibrating flow meter, and more particularly, to a vibrating flow meter including a balanced reference member.

BACKGROUND OF THE INVENTION

Vibrating flow devices such as, for example, densitometers and Coriolis flow meters are used for measuring a characteristic of flowing materials, such as, for example, density, mass flow rate, volume flow rate, totalized mass flow, temperature, and other information. Vibrating flow devices include one or more conduits, which may have a variety of shapes, such as, for example, straight, U-shaped, or irregular configurations.

The one or more conduits have a set of natural vibration modes, including, for example, simple bending, torsional, radial, and coupled modes. At least one driver vibrates the one or more conduits at a resonance frequency in one or more of these drive modes for purposes of determining a characteristic of the flowing material. One or more meter electronics transmit a sinusoidal drive signal to the at least one driver, which is typically a magnet/coil combination, with the magnet typically being affixed to the conduit and the coil being affixed to a mounting structure or to another conduit. The drive signal causes the driver to vibrate the one or more conduits at the drive frequency in the drive mode. For example, the drive signal may be a periodic electrical current transmitted to the coil.

At least one pick-off detects the motion of the conduit(s) and generates a sinusoidal pick-off signal representative of the motion of the vibrating conduit(s). The pick-off is typically a magnet/coil combination, with the magnet typically being affixed to one conduit and the coil being affixed to a mounting structure or to another conduit. However, it should be appreciated that other pick-off arrangements exist such as for example, optical, capacitance, piezo-electric, etc. The pick-off signal is transmitted to the one or more electronics; and according to well known principals the pick-off signal may be used by the one or more meter electronics to determine a characteristic of the flowing material or adjust the drive signal, if necessary.

Typically, vibrating flow devices are provided with two vibrating conduits that vibrate in opposition to each other in order to create an inherently balanced system. As a result, the vibrations from each conduit balance each other out in a manner that prevents undesired vibrations from one conduit from passing to the other conduit. There are, however, certain applications where dual conduits are undesirable, for example, due to problems with pressure drops or clogging. In such situations a single conduit system may be desirable.

Imbalance in single conduit systems arises due to the fact that pick-offs measure motion by determining relative position between a first pick-off component located on a reference member and a second pick-off component located on the conduit. Accordingly, undesirable vibrations that pass to the reference member may cause the component of the pick-offs located on the reference member to vibrate or move in an undesirable manner. This, in turn, may affect the sensed relative position of the pick-off components and generate inaccurate pick-off signals. Furthermore, in some systems, the reference member is designed to vibrate in opposition to the flow conduit. However, if the density of the fluid flowing through the conduit changes, the reference member may not be able to counter the vibrations of the flow conduit.

Attempts at solving this problem have involved using a dummy tube mounting structure that is attached to the conduit via brace bars, and using the motion of the dummy tube to balance the system. While this approach has been somewhat adequate in certain situations, it is generally difficult to balance the system over a wide fluid density range thereby limiting the effectiveness of the prior art approach.

The present invention overcomes these and other problems and an advance in the art is achieved.

SUMMARY OF THE INVENTION

According to one embodiment of the present invention, a flow meter is provided. The flow meter includes a conduit and a driver configured to vibrate the conduit. According to an embodiment of the invention, the flow meter also includes a first pick-off. The first pick-off includes a first pick-off component and a second pick-off component. The vibrating flow meter also includes a reference member. The first pick-off component is coupled to the reference member while the second pick-off component is coupled to the conduit proximate the first pick-off component. The vibrating flow meter also includes a balancing element coupled to the reference member.

According to another embodiment of the invention, a reference member for a flow meter is provided. The reference member can include an active portion. According to an embodiment of the invention, the active portion is adapted to vibrate about a bending axis W-W. According to an embodiment of the invention, the reference member also includes a balancing element coupled to the reference member. The balance element can be adapted to vibrate about the bending axis substantially opposite the active portion.

According to another embodiment of the invention, a method for forming a flow meter including a flow conduit, a driver, and a first pick-off including a first pick-off component and a second pick-off component is provided. The method includes the steps of positioning a reference member proximate the flow conduit and coupling the first pick-off component to the reference member. According to an embodiment of the invention, the method also includes the step of coupling the second pick-off component to the flow conduit proximate the first pick-off component. According to another embodiment of the invention, the method comprises the step of coupling a balancing element to the reference member.

ASPECTS

According to an aspect of the invention, a flow meter comprises:
  a flow conduit;
  a driver configured to vibrate the conduit;
  a first pick-off including a first pick-off component and a second pick-off component;
  a reference member, wherein the first pick-off component is coupled to the reference member and the second pick-off component is coupled to the conduit proximate the first pick-off component; and
  a balancing element coupled to the reference member.

Preferably, the reference member further comprises one or more legs that at least partially define a bending axis of the reference member.

Preferably, the balancing element is coupled to an active portion of the reference member.

Preferably, the balancing element is sized and located such that a momentum of the balancing element is substantially equal and opposite a momentum of an active portion of the reference member.

Preferably, the balancing element is sized and located such that movement of the balancing element about a bending axis W-W of the reference member is substantially opposite movement of an active portion of the reference member.

Preferably, the flow meter further comprises at least a second pick-off including a first pick-off component coupled to the reference member and a second pick-off component coupled to the conduit.

Preferably, the driver includes a first component coupled to the reference member and a second component coupled to the conduit.

Preferably, the balancing element is integral to the reference member.

Preferably, the balancing element is removably coupled to the reference member.

Preferably, the reference member comprises a reference plate.

According to another aspect of the invention, a reference member for a flow meter comprises:
- an active portion adapted to vibrate about a bending axis; and
- a balancing element coupled to the reference member and adapted to vibrate about the bending axis substantially opposite the active portion.

Preferably, the reference member further comprises one or more legs that at least partially define the bending axis.

Preferably, the balancing element is sized and located such that a momentum of the balancing element is substantially equal and opposite a momentum of the active portion.

Preferably, the balancing element is coupled to the active portion of the reference member.

Preferably, the reference member comprises a reference plate.

According to another aspect of the invention, a method for forming a flow meter including a flow conduit, a driver, and a first pick-off including a first pick-off component and a second pick-off component, comprises the steps of:
- positioning a reference member proximate the flow conduit;
- coupling the first pick-off component to the reference member;
- coupling the second pick-off component to the flow conduit proximate the first pick-off component; and
- coupling a balancing element to the reference member.

Preferably, the step of coupling the balancing element comprises coupling the balancing element to an active portion of the reference member.

Preferably, the method further comprises the step of sizing and locating the balancing element such that a momentum of the balancing element is substantially equal and opposite a momentum of an active portion of the reference member.

Preferably, the method further comprises the step of sizing and locating the balancing element such that movement of the balancing element about a bending axis of the reference member is substantially opposite movement of an active portion of the reference member about the bending axis.

Preferably, the method further comprises the step of coupling a first pick-off component of at least a second pick-off to the reference member and coupling a second pick-off component of the at least second pick-off to the flow conduit.

Preferably, the method further comprises the step of coupling a first driver component to the reference member and a second driver component to the conduit.

Preferably, the reference member comprises a reference plate.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
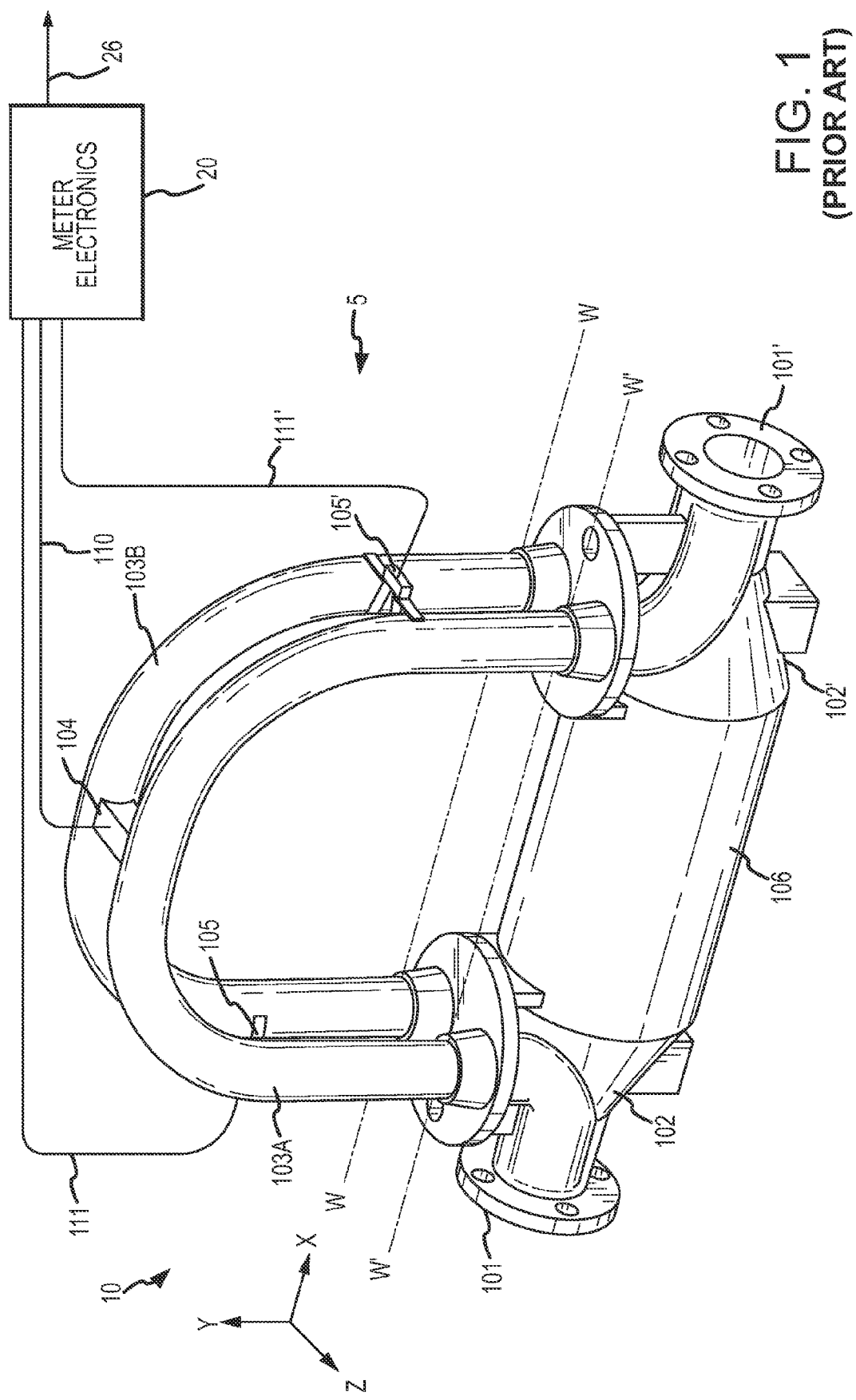
FIG. 1 depicts a perspective view of a prior art dual conduit vibrating flow device.

FIG. 1 illustrates an example of a prior art vibrating sensor assembly 5 in the form of a Coriolis flow meter comprising a flow meter 10 and one or more meter electronics 20. The one or more meter electronics 20 are connected to flow meter 10 to measure a characteristic of a flowing material, such as, for example, density, mass flow rate, volume flow rate, totalized mass flow, temperature, and other information.

The flow meter 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. Spacer 106 maintains the spacing between manifolds 102 and 102' in the present example to prevent undesired vibrations in conduits 103A and 103B. The conduits extend outwardly from the manifolds in an essentially parallel fashion. When flow meter 10 is inserted into a pipeline system (not shown) which carries the flowing material, the material enters flow meter 10 through flange 101, passes through inlet manifold 102 where the total amount of material is directed to enter conduits 103A and 103B, flows through conduits 103A and 103B and back into outlet manifold 102' where it exits the flow meter 10 through flange 101'.

The flow meter 10 includes a driver 104. The driver 104 is affixed to conduits 103A, 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. Driver 104 may comprise one of many well known arrangements, such as a magnet mounted to the conduit 103A and an opposing coil mounted to the conduit 103B.

In the present example, the drive mode is the first out of phase bending mode and the conduits 103A and 103B are preferably selected and appropriately mounted to inlet manifold 102 and outlet manifold 102' so as to provide a balanced system having substantially the same mass distribution, moments of inertia, and elastic modules about bending axes W-W and W'-W', respectively. In the present example, where the drive mode is the first out of phase bending mode, the conduits 103A and 103B are driven by driver 104 in opposite directions about their respective bending axes W and W'. A drive signal in the form of an alternating current can be provided by one or more meter electronics 20, such as for example via pathway 110, and passed through the coil to cause both conduits 103A, 103B to oscillate. Those of ordinary skill in the art will appreciate that other drive modes may be used within the scope of the present invention.

The balanced system described above vibrates the flow conduits 103A, 103B generally in the Z-direction as shown. Other directions include the X-direction along the pipeline and the Y-direction, which is perpendicular to both the Z and X-directions. This coordinate system is used throughout the application and may aid in the understanding of the invention. It should be appreciated that other coordinate systems may be used and the particular coordinate system used should not limit the scope of the present invention.

The flow meter 10 shown includes a pair of pick-offs 105, 105' that are affixed to conduits 103A, 103B. More particularly, a first pick-off component (not shown) is located on conduit 103A and a second pick-off component (not shown) is located on conduit 103B. In the embodiment depicted, the pick-offs 105, 105' are located at opposing ends of the conduits 103A, 103B. The pick-offs 105, 105' may be electromagnetic detectors, for example pick-off magnets and pick-off coils that produce pick-off signals that represent the velocity and position of the conduits 103A, 103B. For example, the pick-offs 105, 105' may supply pick-off signals to the one or more meter electronics 20 via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

In the example shown in FIG. 1, the one or more meter electronics 20 receive the pick-off signals from the pick-offs 105, 105'. Path 26 provides an input and an output means that allows one or more meter electronics 20 to interface with an operator. The one or more meter electronics 20 measure a characteristic of a flowing material, such as, for example, density, mass flow rate, volume flow rate, totalized mass flow, temperature, and other information. More particularly, the one or more meter electronics 20 receive one or more signals, for example, from pick-offs 105, 105' and one or more temperature sensors (not shown), and use this information to measure a characteristic of a flowing material, such as, for example, density, mass flow rate, volume flow rate, totalized mass flow, temperature, and other information.

The techniques by which vibrating measuring devices, such as, for example, Coriolis flow meters or densitometers, measure a characteristic of a flowing material are well understood; see, for example, U.S. Pat. No. 6,505,131, the disclosure of which is hereby incorporated herein by reference; therefore, a detailed discussion is omitted for brevity of this description.

Figure 2:
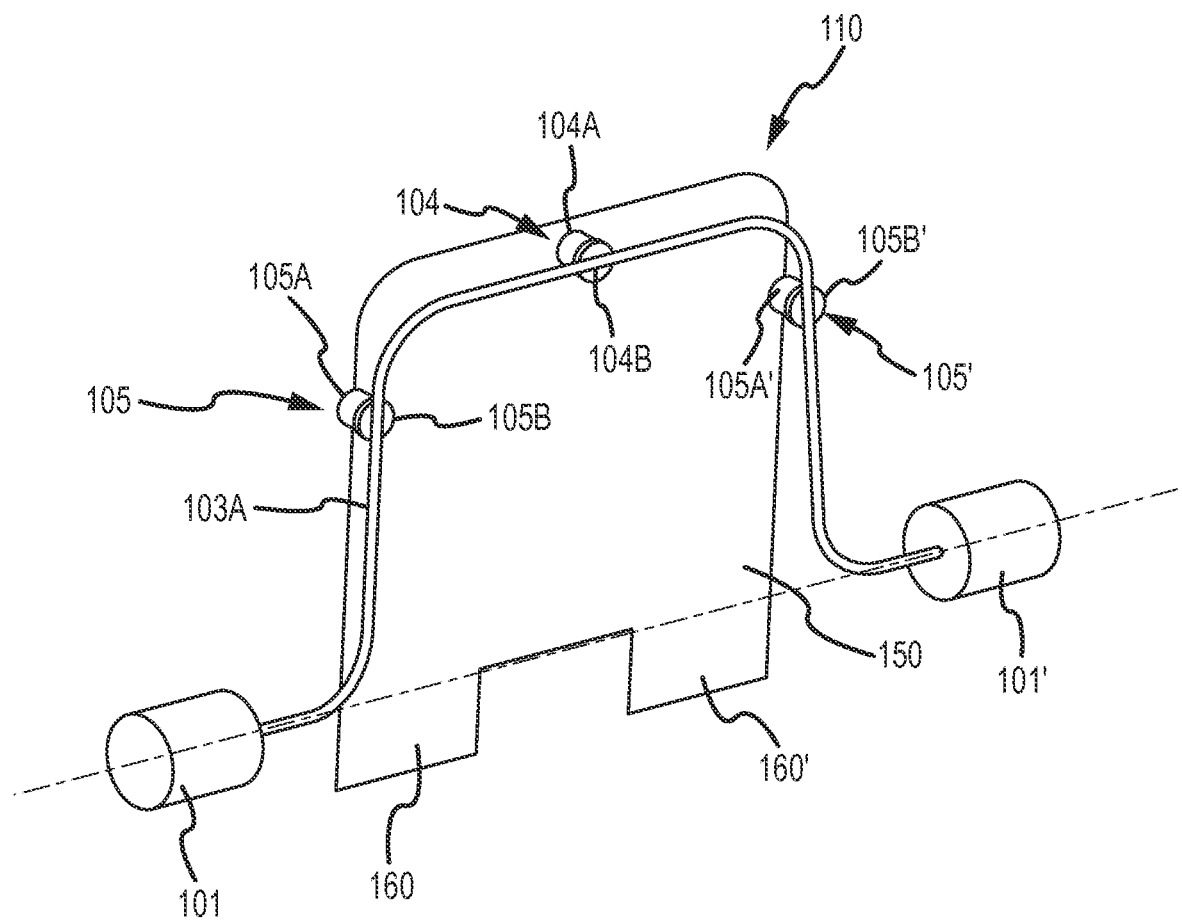
FIG. 2 depicts a perspective view of a prior art single conduit sensor assembly.
Figure 3:
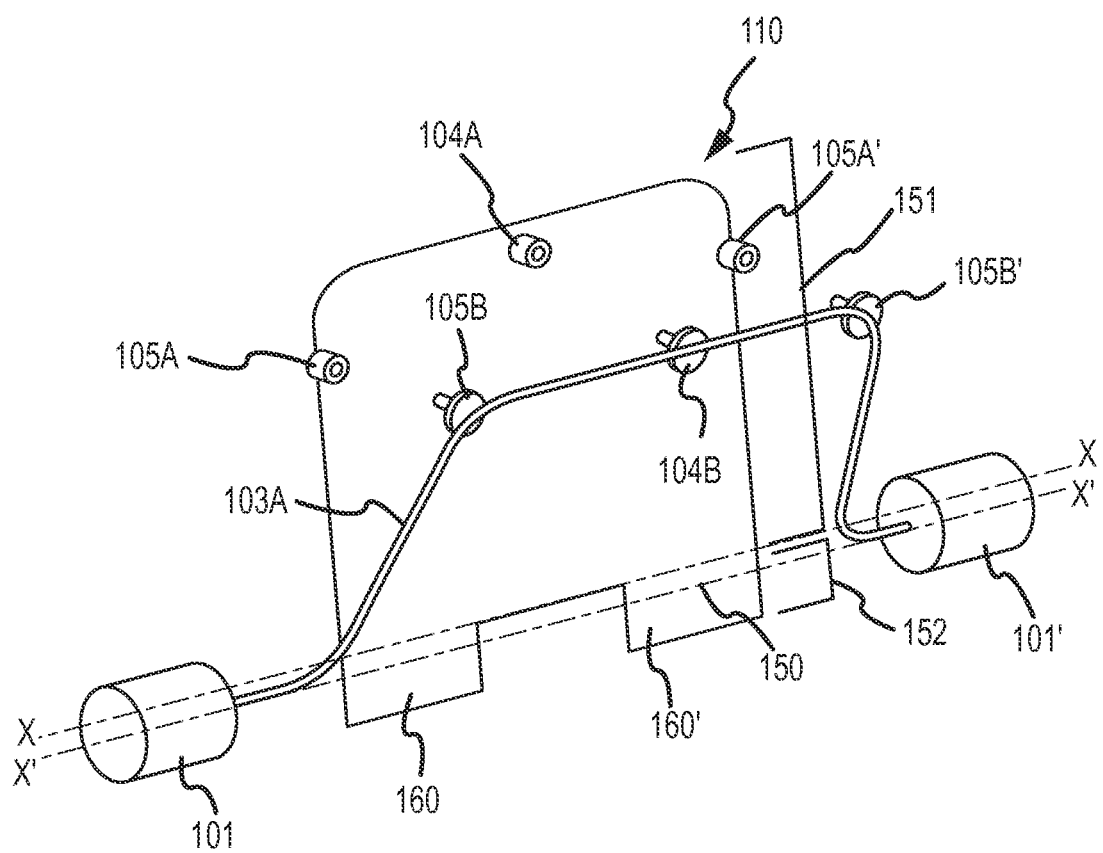
FIG. 3 depicts a perspective view of a prior art single conduit sensor assembly.

Turning now to FIGS. 2 and 3, another example of a prior art flow meter is shown at 110. The flow meter 110 is similar to the flow meter 10 shown in FIG. 1, except that the flow meter 110 includes a single conduit 103A and a reference member 150 on which a portion of the driver 104 and pick-offs 105, 105' are mounted. In the example depicted, the conduit 103A and reference member 150 are not directly connected together. However, the reference member 150 is positioned proximate the flow conduit 103A such that the first and second components of the driver 104 and pick-offs 105, 105' can interact with one another as is generally known in the art. The particular distance between the reference member 150 and the flow conduit 103A may depend upon a number of considerations including, but not limited to, the size of the flow conduit 103A, the size of the driver 104 and pick-offs 105, 105', and the mounting structure to which the flow meter 110 is mounted. Therefore, it should be appreciated that the particular distance between the reference member 150 and the flow conduit 103A may vary from one flow meter to another.

According to another aspect of the present embodiment, unlike a flow tube, the reference member 150 may be a structure through which the material does not flow; for example, as shown, a reference plate or any other structure, regardless of shape. Therefore, although the reference member 150 is shown as comprising a reference plate, the present invention should not be limited to a plate; but rather, the reference member 150 may comprise any desired shape. It should be appreciated that, although not shown, the reference member 150 may be substantially rigidly coupled to a stationary component. Neither the mounting of the reference member 150 nor the mounting of the flow conduit 103A within a pipeline is shown in the figures for the purpose of reducing the complexity of the drawings. Furthermore, the meter electronics 20 has been omitted from FIGS. 2-4 in order to simplify the drawing complexity. However, it should be appreciated that in practice, the flow meter 110 and 210 will be connected to a meter electronics in a manner similar to that described with respect to FIG. 1.

As shown, a first driver component 104a and first pick-off components 105a, 105a' are coupled to the reference member 150. Also shown, a second driver component 104b and second pick-off components 105b, 105b' are coupled to the conduit 103A. The first components 104a, 105a, 105a' may be a coil and the second components 104b, 105b, 105b' may be a magnet. Alternatively, the first components 104a, 105a, 105a' may be a magnet and the second components 104b, 105b, 105b' may be a coil. Other configurations are also possible, such as optical sensors, capacitance sensors, or piezo electric sensors, for example. Therefore, the present invention should not be limited to magnet/coil sensors.

In the present example, the first and second driver components 104a, 104b of the driver 104 forces the conduit 103A to oscillate about a bending axis W'-W'. In the example shown in FIGS. 2 and 3, as the driver 104 vibrates the conduit 103A about the axis W'-W', even though the reference member 150 is not directly connected to the conduit 103A, the driver 104 may also excite the reference member 150 and cause movement of the first pick-off components 105a, 105a'. In other words, the driver 104 may cause an active portion 151 of the reference member 150 to vibrate about a bending axis W-W, similar to the way flow tube 103B vibrated in FIG. 1, while a substantially stationary portion 152 does not vibrate or at least not to the degree as the active portion 151. The location of the reference member bending axis W-W may be at least partially determined based on the shape and stiffness of the reference member 150. According to the reference member 150 shown in FIGS. 3 & 4, the bending axis W-W is at least partially defined by the one or more legs 160, 160'. Although two legs 160, 160' are shown, it should be appreciated that the reference member 150 may only include one leg or may include more than two legs. Therefore, the particular number of legs 160, 160' provided should not limit the scope of the present invention.

Unlike the system in FIG. 1, where vibrations about the bending axis W-W of the flow tube 103B are desirable, the movement of the active portion 151 of the reference member 150 about axis W-W is generally considered undesirable. This is because in the embodiment shown, the first components of the driver and pick-offs 104a, 105a, 105a' are coupled to the active portion 151 of the reference member 150 and therefore, the movement of the active portion 151 of the reference member 150 may be perceived as movement caused by fluid flow through the conduit, thereby causing erroneous measurements. It should be appreciated however, that even if the first components of the driver and pick-offs 104a, 105a, 105a' were coupled to the stationary portion 152 of the reference member 150, the vibrations created by the active portion 151 could still be experienced and create measurement errors. Yet another problem is that vibrations external to the sensor assembly 110, for example, vibrations generated by a pump or valve, may also be transmitted to the reference member 150. Such undesired vibrations may impart undesired motion to the first pick-off components 105a, 105a' and adversely affect the accuracy of the pick-off signals from the pick-offs 105, 105'.

Although attempts to limit the motion of the reference member 150 have reduced movement of the active portion 151 of the reference member 150, some movement is still typically experienced. This may be particularly true when the fluid density of the fluid flowing through the flow conduit 103A changes. A change in the fluid density may affect the amplitude of vibration and require a greater or lesser drive force resulting in a change in the force being experienced by the reference member 150.

Figure 4:
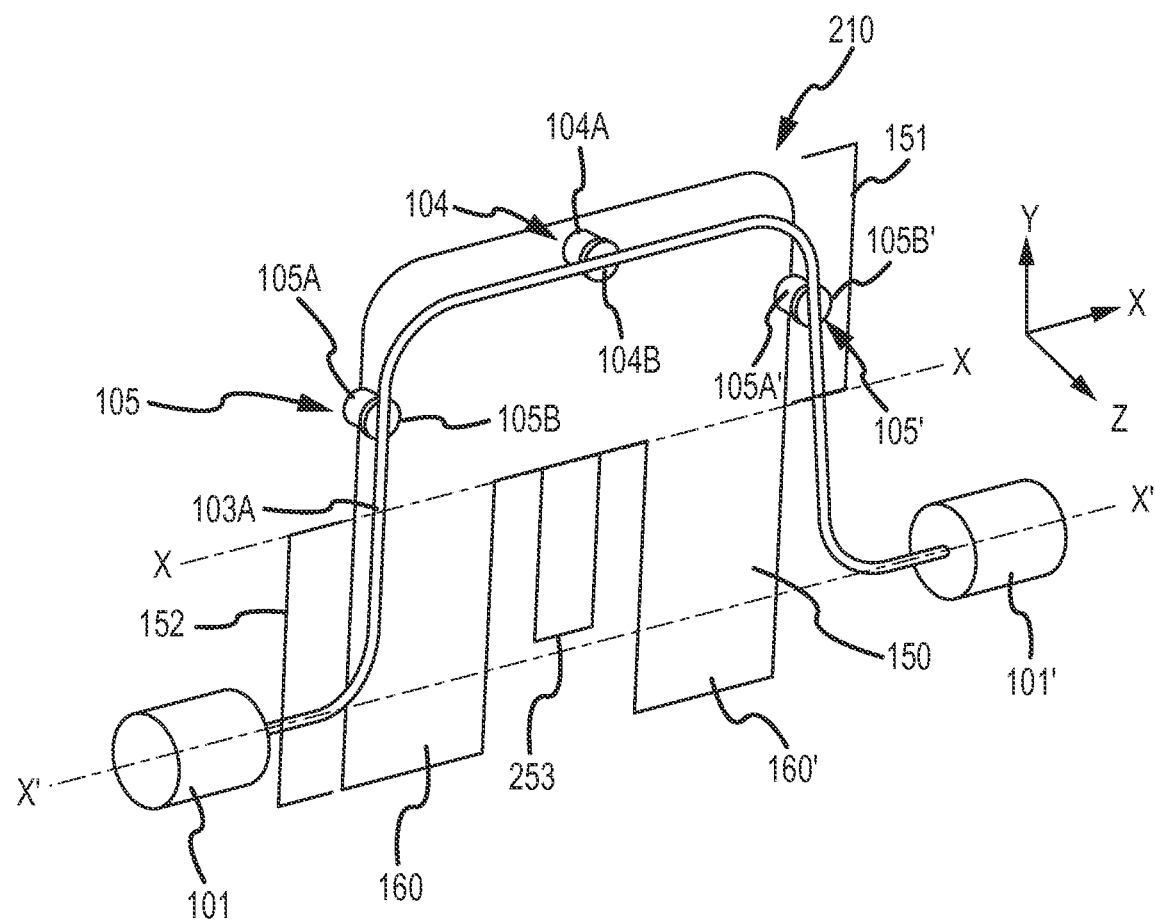
FIG. 4 depicts a perspective view of an embodiment of single conduit sensor assembly.

FIG. 4 shows a flow meter system 210 according to an embodiment of the invention. As shown, the flow meter 210 is similar to the flow meter 110 shown in FIGS. 2 and 3, except that the reference member 150 includes at least one balancing element 253. According to an embodiment of the invention, the balancing element 253 comprises a portion of the reference member 150 that provides a means for balancing out vibrations transmitted to the reference member 150. According to an embodiment of the invention, the balancing element 253 can be positioned between the legs 160, 160' that at least partially define the bending axis W-W of the reference member 150. According to an embodiment of the invention, the balancing element 253 may be coupled to the active portion 151 of the reference member 150. However, it should be appreciated that in other embodiments, the balancing element 253 may be coupled to another portion of the reference member 150, such as the inactive portion 152 or one of the legs 160, 160'.

Advantageously, the balancing element 253 can be sized and located on the reference member 150 such that vibrations of the reference member 150 about bending axis W-W are substantially opposite vibrations of the balancing element 253. According to some embodiments, the balancing element 253 may be sized and located such that the momentum of the balancing element 253 is substantially equal and opposite the momentum of the active portion of the reference member 150 about bending axis W-W. In other words, using the coordinate system provided, as the active portion 151 attempts to move away from the flow conduit 103A in the −Z, −Y-direction, the balancing element 253 provided on the opposite side of the bending axis W-W moves in the +Z, +Y-direction. Therefore, the movement of the active portion 151 of the reference member 150 can be substantially countered. Therefore, the balancing element 253 may be sized and located such that the mass times velocity (momentum) of the balancing element 253 about the W-W axis is substantially equal to the mass times velocity of the active portion 151 of the reference member 150, thereby creating substantially equal and opposite momentums. In other embodiments, the balancing element 253 may be sized and located such that the momentum of the balancing element 253 is substantially opposite, but greater than the momentum of the active portion 151 of the reference member 150. Doing so may further restrict movement of the active portion 151.

In some embodiments, the stiffness and mass of the balancing element 253 may be chosen such that the natural frequency of the balancing element 253 is below the drive frequency. As a result, the balancing element 253 tends to move out of phase with the movement of the active portion 151 of the reference member 150. Therefore, vibrations of the reference member 150 are minimized, thereby minimizing the movement of the first components of the driver and pick-offs 104a, 105a, 105a'.

According to an embodiment of the invention, the balancing element 253 may be sized and located on the reference member 150 such that the balancing element 253 moves opposite the reference member 150 and more specifically, the active portion 151 of the reference member 150. For example, as described above, in some embodiments, as the flow conduit 103A is driven by the driver 104, the driver 104 will also excite the reference member 150 causing the reference member 150 to vibrate about an axis W-W. Although it is desirable to create a stationary reference member 150 that does not vibrate, such attempts prove difficult and often vary depending upon the flow meter mounting conditions. However, the balancing element 253 can be provided such that vibrations of the reference member 150 about axis W-W are opposed by the balancing element 253. Therefore, movement of the reference member 150 in the region of the first driver and pick-off components 104a, 105a, 105a' can be minimized. This is because as the top portion (active portion 151) of the reference member 150 where the first driver and pick-off components 104a, 105a, 105a' moves in a first direction, for example the −Z, −Y-direction, the balancing element 253 moves in a second direction, for example the +Z, +Y-direction, which is opposite the first direction. Therefore, movement of the reference member 150 not only requires enough force to overcome the stiffness of the reference member 150, but also requires enough force to overcome the countering force of the balancing element 253.

Those of ordinary skill in the art should appreciate that the balancing element 253 can be adjusted by determining the appropriate, material, location, shape, length, width, thickness, mass and/or other characteristics that balances out the vibrations transmitted to the reference member 150. Those of ordinary skill in the art will appreciate that in practice, flow meters are generally not identical to each other. For example, and not limitation, flow meters generally differ, at least to some extent, in their amount of mass, in their distribution of mass, in the vibration amplitudes and/or frequencies involved, and in the particular material or density of the particular material that flows through the conduit. Those of ordinary skill in the art will appreciate that even small differences in mass, distribution of mass, vibration amplitudes and/or frequencies, and in the particular material or density of the particular material that flows through the conduit may affect the material, location, shape, length, width, thickness, mass, and/or other characteristics of the balancing element 253. Accordingly, those of ordinary skill in the art will appreciate that certain routine testing may be required in order to determine the appropriate material, location, shape, length, width, thickness, mass and/or other characteristics of the balancing element 253. For example, a particular balancing element 253 may be sized and located to accommodate a certain fluid density range. The fluid density range may be chosen based upon the density of the expected fluid. If a fluid having a different density is measured, the balancing element 253 can be replaced by an appropriately sized balancing element 253 to accommodate the new fluid density.

Those of ordinary skill in the art will appreciate that, within the scope of the present invention, more than one balancing element 253 may be used. Furthermore, in such situations, balancing elements 253 may have different shapes, lengths, widths, thicknesses, and/or masses. Those of ordinary skill in the art will appreciate that the balancing element 253 may be integral to the reference member 150, as shown. Alternatively, the balancing element 253 may be a separate structure that is connected, for example, and not limitation, removably connected to reference member 150. Furthermore, although the driver 104 may include a first driver component 104a connected to the reference member 150 and a second driver component 104b connected to the conduit 103A, as shown, those of ordinary skill in the art will appreciate that in alternative embodiments the driver 104 may be a device, for example, and not limitation, a piezoelectric device, that is connected to the conduit 103A, but not the reference member 150.

It should be apparent to those skilled in the art that it is within the scope of the present invention to use the principals discussed herein in conjunction with any type of vibrating flow device, including, for example, Coriolis flow meters, densitometers, regardless of the number of drivers, the number of pick-offs, the operating mode of vibration, or the determined characteristic of the flowing material. Furthermore, although the above description has been limited to single tube flow meters, it is well within the scope of the present invention to include the features of the present invention in dual flow tube flow meters. For example, the reference member 150 may be provided between the flow tubes 103A, 103B. In addition, although the embodiments shown depict flow meters having curved or U-shaped flow conduits, it should be appreciated that the present invention is equally applicable to straight tube flow meters or flow meters having irregular shaped flow tubes. The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A flow meter (210), comprising:
   a flow conduit (103A);
   a driver (104) configured to vibrate the conduit (103A);
   a first pick-off (105) including a first pick-off component (105a) and a second pick-off component (105b);
   a reference member (150), wherein the first pick-off component (105a) is coupled to the reference member (150) and the second pick-off component (105b) is coupled to the conduit (103A) proximate the first pick-off component (105a); and
   a balancing element (253) coupled to the reference member (150).

2. The flow meter (210) of claim 1, wherein the reference member (150) further comprises one or more legs (160, 160') that at least partially define a bending axis (W-W) of the reference member (150).

3. The flow meter (210) of claim 1, wherein the balancing element (253) is coupled to an active portion (151) of the reference member (150).

4. The flow meter (210) of claim 1, wherein the balancing element (253) is sized and located such that a momentum of the balancing element (253) is substantially equal and opposite a momentum of an active portion (151) of the reference member (150).

5. The flow meter (210) of claim 1, wherein the balancing element (253) is sized and located such that movement of the balancing element (253) about a bending axis (W-W) of the reference member (150) is substantially opposite movement of an active portion (151) of the reference member (150).

6. The flow meter (210) of claim 1, further comprising at least a second pick-off (105') including a first pick-off component (105a') coupled to the reference member (150) and a second pick-off component (105b') coupled to the conduit (103A).

7. The flow meter (210) of claim 1, wherein the driver (104) includes a first component (104a) coupled to the reference member (150) and a second component (104b) coupled to the conduit (103A).

8. The flow meter (210) of claim 1, wherein the balancing element (253) is integral to the reference member (150).

9. The flow meter (210) of claim 1, wherein the balancing element (253) is removably coupled to the reference member (150).

10. The flow meter (210) of claim 1, wherein the reference member (150) comprises a reference plate.

11. A reference member (150) for a flow meter (210), comprising:
    an active portion (151) adapted to vibrate about a bending axis (W-W); and
    a balancing element (253) coupled to the reference member (150) and adapted to vibrate about the bending axis (W-W) substantially opposite the active portion (151).

12. The reference member (150) of claim 11, further comprising one or more legs (160, 160') that at least partially define the bending axis (W-W).

13. The reference member (150) of claim 11, wherein the balancing element (253) is sized and located such that a momentum of the balancing element (253) is substantially equal and opposite a momentum of the active portion (151).

14. The reference member (150) of claim 11, wherein the balancing element (253) is coupled to the active portion (151) of the reference member (150).

15. The reference member (150) of claim 11, wherein the reference member (150) comprises a reference plate.

16. A method for forming a flow meter including a flow conduit, a driver, and a first pick-off including a first pick-off component and a second pick-off component, comprising the steps of:
    positioning a reference member proximate the flow conduit;

coupling the first pick-off component to the reference member;

coupling the second pick-off component to the flow conduit proximate the first pick-off component; and coupling a balancing element to the reference member.

17. The method of claim 16, wherein the step of coupling the balancing element comprises coupling the balancing element to an active portion of the reference member.

18. The method of claim 16, further comprising the step of sizing and locating the balancing element such that a momentum of the balancing element is substantially equal and opposite a momentum of an active portion of the reference member.

19. The method of claim 16, further comprising the step of sizing and locating the balancing element such that movement of the balancing element about a bending axis of the reference member is substantially opposite movement of an active portion of the reference member about the bending axis.

20. The method of claim 16, further comprising the step of coupling a first pick-off component of at least a second pick-off to the reference member and coupling a second pick-off component of the at least second pick-off to the flow conduit.

21. The method of claim 16, further comprising the step of coupling a first driver component to the reference member and a second driver component to the conduit.

22. The method of claim 16, wherein the reference member comprises a reference plate.

\* \* \* \* \*